(12) United States Patent
Feng et al.

(10) Patent No.: US 11,374,502 B2
(45) Date of Patent: Jun. 28, 2022

(54) POWER MANAGEMENT FOR WIRELESS NODES

(71) Applicant: CASE WESTERN RESERVE UNIVERSITY, Cleveland, OH (US)

(72) Inventors: Philip X. L. Feng, Cleveland, OH (US); Shiquan Fan, Cleveland, OH (US); Liuming Zhao, Cleveland, OH (US); Ran Wei, Cleveland, OH (US); Zenghui Wang, Cleveland, OH (US); Xu-Qian Zheng, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 302 days.

(21) Appl. No.: 16/497,670

(22) PCT Filed: Apr. 2, 2018

(86) PCT No.: PCT/US2018/025720
§ 371 (c)(1),
(2) Date: Sep. 25, 2019

(87) PCT Pub. No.: WO2018/184015
PCT Pub. Date: Oct. 4, 2018

(65) Prior Publication Data
US 2021/0135593 A1 May 6, 2021

Related U.S. Application Data

(60) Provisional application No. 62/479,750, filed on Mar. 31, 2017.

(51) Int. Cl.
*H02M 7/219* (2006.01)
*H04W 4/38* (2018.01)
*H02N 2/00* (2006.01)
*H04L 67/12* (2022.01)

(52) U.S. Cl.
CPC .............. *H02M 7/219* (2013.01); *H02N 2/00* (2013.01); *H04L 67/12* (2013.01); *H04W 4/38* (2018.02); *H02M 7/2195* (2021.05)

(58) Field of Classification Search
CPC .. H02M 7/219; H02M 7/2195; H02M 1/0085; H04W 4/38; H02N 2/00; H04L 67/12
See application file for complete search history.

(56) References Cited

U.S. PATENT DOCUMENTS

| 4,369,490 A | 1/1983 | Blum |
| 5,939,867 A | 8/1999 | Capici et al. |
| 6,489,831 B1 | 12/2002 | Matranga et al. |

(Continued)

*Primary Examiner* — Emily P Pham
(74) *Attorney, Agent, or Firm* — Tarolli, Sundheim, Covell & Tummino LLP (57) ABSTRACT

A system includes a rectifier having an input configured to receive a variable AC input voltage and convert the AC input voltage to a rectified output voltage. A power converter has an input coupled to receive the rectified output voltage and to provide a DC supply voltage at an output thereof. A low drop-out regulator has an input coupled to receive the supply voltage and is configured provide a regulated voltage. A sensor is coupled to receive the regulated voltage as a power source and is configured to sense a condition and provide sensor data indicative of the sensed condition.

16 Claims, 9 Drawing Sheets

(56) References Cited

U.S. PATENT DOCUMENTS

| | | |
|---|---|---|
| 10,014,570 B2 * | 7/2018 | Arbabian .............. H04B 13/005 |
| 2005/0105231 A1 | 5/2005 | Hamel et al. |
| 2008/0030178 A1 | 2/2008 | Leonard et al. |
| 2011/0227543 A1 | 9/2011 | Ivanov |
| 2016/0241146 A1 | 8/2016 | Oliaei |

* cited by examiner

POWER MANAGEMENT FOR WIRELESS NODES

CROSS REFERENCE TO RELATED APPLICATION

This application claims the benefit of U.S. Provisional Patent Application No. 62/479,750, filed Mar. 31, 2017, and entitled SENSOR SYSTEM COMPRISING A BATTERY-LESS SENSOR NODE, which is incorporated herein by reference in its entirety.

GOVERNMENT INTEREST

This invention was made with government support under Grant No. DE-EE0006719 awarded by the Department of Energy. The United States government has certain rights to the invention.

TECHNICAL FIELD

This disclosure relates to power management for wireless nodes, such as low-power circuitry to supply power to one or more sensors.

BACKGROUND

Energy harvesting is a process by which energy is derived from external sources (e.g., solar power, thermal energy, wind energy, salinity gradients, and kinetic energy, also known as ambient energy), captured, and stored for small, wireless autonomous devices, such as for use in wireless sensor networks (WSNs) and/or for enabling the Internet of Things (IoT). For example, the development of WSN and IoT applications increasingly demands high integration, ultra-small volume, low cost, long lifetime, and maintenance-free operations. A main challenge for these and related applications is reducing power consumption by the circuitry utilized to harvest, store and use power.

SUMMARY

This disclosure relates to power management for wireless nodes, such as low-power circuitry to supply power to one or more sensors.

As one example, a system includes a rectifier having an input configured to receive an variable AC input voltage and convert the AC input voltage to a rectified output voltage. A power converter has an input coupled to receive the rectified output voltage and to provide a DC supply voltage at an output thereof. A low drop-out regulator has an input coupled to receive the supply voltage and is configured provide a regulated voltage. A sensor is coupled to receive the regulated voltage as a power source and is configured to sense a condition and provide sensor data indicative of the sensed condition.

As another example, a system includes a sensor node. The sensor node includes an energy harvester module, power management application specific integrated circuit (ASIC) and a radio frequency module. The energy harvester module is configured to convert ambient energy into an electrical signal. The power management ASIC includes a rectifier, a DC-DC converter, a low drop-out regulator, and a sensor. The rectifier includes an input connected to receive the electrical signal and is configured to convert the electrical signal to a rectified voltage. The DC-DC converter includes an input coupled to receive the rectified output voltage and to provide a DC supply voltage at an output thereof. The low drop-out regulator is coupled to receive the DC supply voltage and provide a regulated voltage. The sensor is coupled to receive the regulated voltage and is configured to sense a condition and provide sensor data indicative of the sensed condition. The radio frequency module is configured to wirelessly transmit the sensor data.

DETAILED DESCRIPTION

This disclosure relates to power management for wireless nodes. For example, systems and devices disclosed herein provide a low-power, integrated circuit (e.g., a monolithic chip) that may supply electrical power to one or more sensors, which may be implemented as a node in a wireless sensor network (e.g., an Internet of Things (IoT) sensor networks). The electrical power management circuitry and one or more sensors may be implemented as an application specific integrated circuit (ASIC). The ASIC includes circuitry configured to manage the conversion and storage of electrical energy that is provided from one or more energy sources (e.g., external energy harvesting circuitry).

As an example, the ASIC includes a rectifier having an input configured to receive a variable AC input voltage (e.g., from energy harvester) and to convert the AC input voltage to a rectified output voltage. A power converter has an input coupled to receive rectified output voltage and is configured to convert the rectified voltage to provide a DC supply voltage at an output. A capacitor (e.g., a supercapacitor) or other energy storage device may be coupled to the output to store the electrical energy that is supplied to other components within and external to the ASIC. For instance, the supply voltage may also be used to power external circuitry, such as including a radio frequency (RF) transmitter and/or control logic, which form part of the wireless node. A low drop-out regulator (e.g., an ultra-low power LDO) includes an input coupled to the supply voltage and is configured to provide a regulated voltage. The one or more sensors are coupled to receive the regulated voltage for powering the sensor, such that the sensor is enabled to sense a condition and provide corresponding sensor data (e.g., a digital value) indicative of the sensed condition.

The ASIC and external components thus may form a complete wireless sensor node, which is applicable for the Internet of Things (IoT) sensor networks. The merit of this system is that it consumes low quiescent current to achieve the energy conversion, storage, transfer and regulation with maximum power point tracking (MPPT) to efficiently supply power to operate the on-chip sensor load. In addition, configurable impedance of the converter and simple periphery circuit of the system benefit from the large scale integration (LSI) design of the chip further making the ASIC scalable to provide low-cost, maintenance-free, and miniature sensors for pervasive IoT sensor networks.

Figure 1:
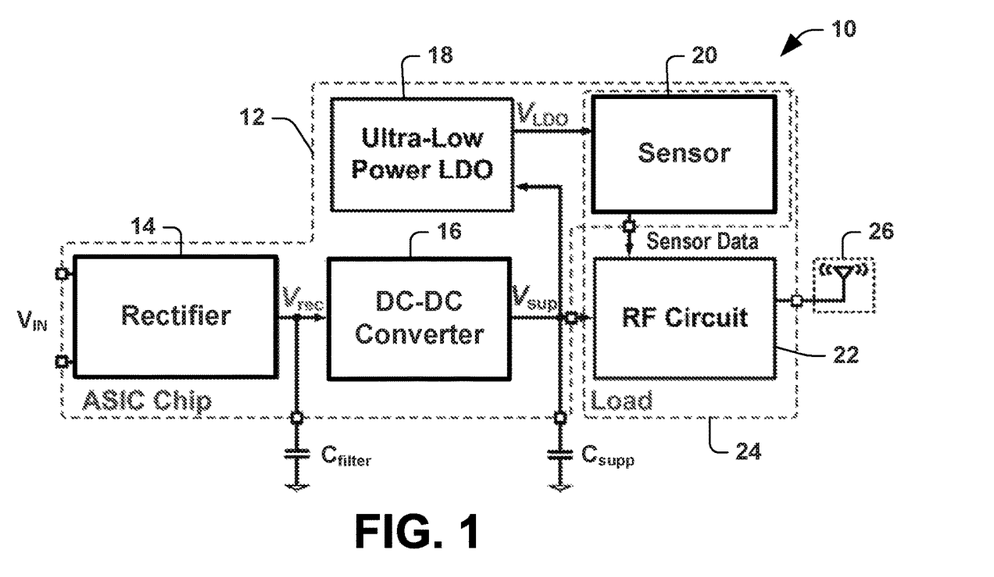
FIG. 1 depicts an example of an application specific integrated circuit chip.

FIG. 1 depicts an example of a power supply system 10 that includes an ASIC chip (also referred to herein as an ASIC) 12. The system 10 may define a sensor node in a wireless sensing network that may include any number of such nodes. The ASIC 12 is a monolithic structure, providing a system on chip (SoC). The ASIC 12 includes input terminals configured to receive an AC input voltage $V_{IN}$, such as from an energy harvesting circuit or another energy source. For example, the energy source may be in the form of a piezoelectric vibrational energy harvester connected to the input terminals to convert ambient, environmental energy into an electrical signal for supplying the AC input voltage $V_{IN}$ to the rectifier 14. The rectifier 14 converts the alternating current input signal from the energy harvester to a rectified voltage $V_{REC}$.

For example, the rectified voltage is coupled to another terminal of the ASIC 12 to which a filter (e.g., an external filter) is coupled, such as a capacitor $C_{filter}$ that is configured to smooth the rectified voltage $V_{REC}$. The rectified voltage $V_{REC}$ drives a DC-DC converter 16 that is configured to convert the input DC rectified voltage to a corresponding DC supply voltage $V_{SUP}$. For example, the converter 16 is a boost converter that steps up the DC rectified voltage and provides the supply voltage $V_{SUP}$ to a voltage supply rail of the ASIC 12. This supply rail $V_{SUP}$ is also attached to a terminal of the ASIC to which an energy storage device is coupled. In the example of FIG. 1, the energy storage device is demonstrated as an external supercapacitor $C_{SUPP}$. The capacitor $C_{SUPP}$ stores electrical energy based upon the supply voltage $V_{SUP}$ provided by the boost converter 16. The supply voltage $V_{SUP}$ from the boost converter thus provides electrical energy to other components of the ASIC chip 12 as well as available to external circuitry.

In the example of FIG. 1, an ultra-low power LDO provides a regulated output voltage demonstrated at $V_{LDO}$. The regulated voltage $V_{LDO}$ is supplied to a sensor 20 which is part of the ASIC chip 12. The sensor 20 is configured to sense a condition and in turn provide output sensor data. For example, the sensor 20 is configured to monitor one or more physical or environmental conditions, such as temperature, sound, pressure, etc. and to cooperatively pass their data through the network to a remote monitoring location. In some examples, the sensing system may be configured to perform industrial process monitoring and control, machine health monitoring, and so on. As one example, the sensor 20 is a temperature sensor implemented in complementary metal-oxide-semiconductor (CMOS) technology, such as a bandgap temperature sensor that includes one or more current sources to provide proportional-to-absolute temperature (PTAT) output current that is used to generate a multi-bit digital temperature value.

In the example of FIG. 1, the sensor 20 supplies the sensor data to a radio frequency (RF) circuit 22. The RF circuit 22 receives power from the boost converter, as stored in the energy storage device $C_{SUP}$. In the example of ASIC 12 of FIG. 1, the sensor 20 and RF circuit 22 thus define a load 24 that is supplied with electrical energy from the voltage supply $V_{SUP}$, which is stored in the $C_{SUPP}$. For instance, the RF circuit 22 may be coupled to a first terminal to receive the supply voltage $V_{SUP}$ and another terminal to receive the sensor data from the sensor 20. The RF circuit thus is configured to (e.g., periodically or intermittently) to wirelessly transmit sensor data to a remote device. The RF circuit 22 can provide an RF signal to a corresponding antenna 26 to wirelessly transmit the sensor data through a network to a remote location. As an example, the RF circuit 22 may be configured to implement a wireless standard protocol, such as ZigBee, Z-wave, LoRaWAN, NarrowBand IOT, LTE-M and IEEE 802.15.4 to name a few. The wireless protocol may be implemented to reduce the power consumption. In some examples, the RF circuit 22 may be configured as a transceiver to provide bi-directional communication in the network, such as thereby enabling control of sensor activity. The periodic time interval for data exchange can be programmed to vary as a function of the energy storage device, which may be set to default parameter or be user-programmable. For the example, where the sensor 20 is a temperature sensor, a periodic transmission rate of approximately 15 minutes per data transmission may be used to send the on-chip temperature data through the network. Other transmission intervals may be used in other examples.

Figure 2:
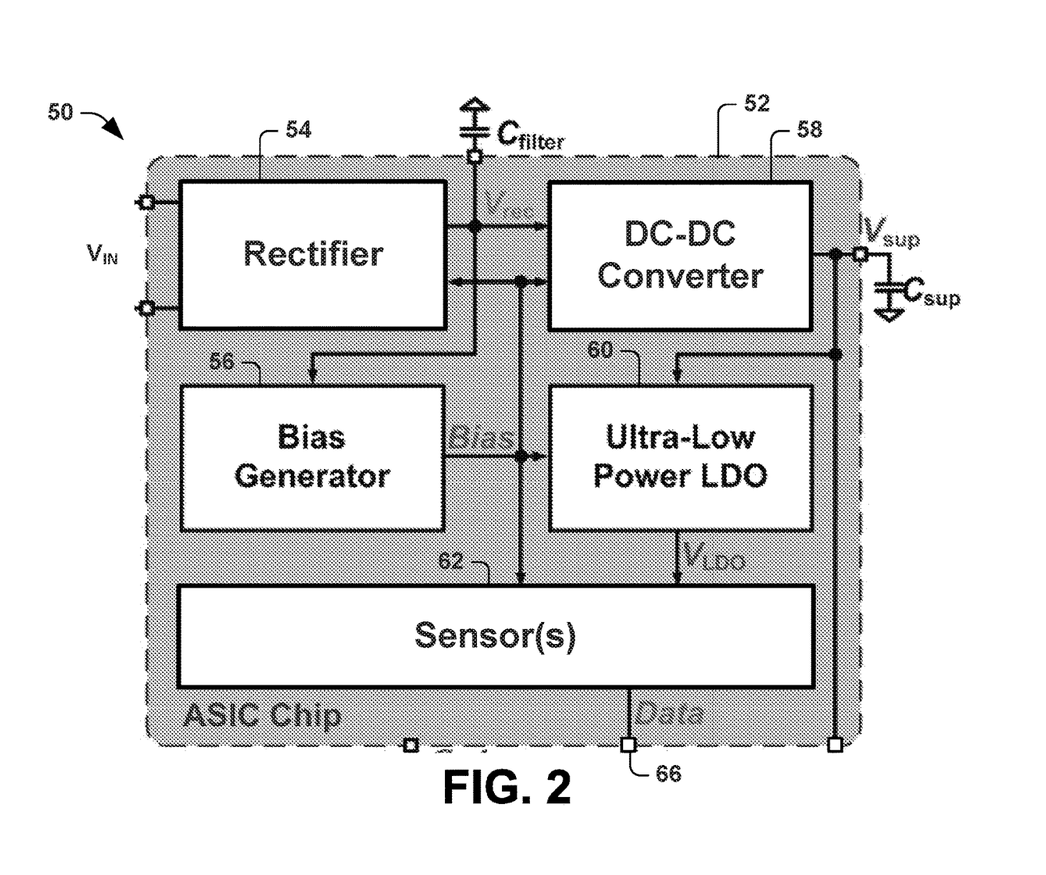
FIG. 2 depicts another example of an application specific integrated circuit chip.

FIG. 2 illustrates an example of another power supply system 50 that can be utilized in a sensor node in a wireless sensor network. The system 50 includes an ASIC (e.g., a system on chip (SoC)) 52 that includes a plurality of components to provide power management and sensing functions for the system 50. Similar to the example of FIG. 1, the ASIC 52 includes a rectifier 54 that converts an AC input signal $V_{IN}$ to a corresponding rectified voltage (e.g., a DC voltage). The rectified voltage $V_{REC}$ can be coupled to a terminal to which a filter capacitor $C_{filter}$ is connected to remove ripple from the rectified voltage. The rectified voltage may be supplied to a bias generator 56 and to a DC-DC converter 58 of the ASIC 52. For example, after the rectifier 54 sufficiently charges the filter capacitor $C_{filter}$ (e.g., $V_{rec}$ exceeds a threshold $V_{th}$), the on-chip bias generator circuit 56 starts working, thereby enabling the DC-DC converter 58 and LDO 60.

The bias generator 56 is configured to bias associated components of the chip. This may include generating a bias current as well as a reference voltage, which is generated based on the bias current. The bias generator 56 can be configured to supply the bias in response to a low rectified voltage level (e.g., from rectifier 54), such as to initiate (start-up) operation of the ASIC 52 even under low power conditions.

The DC-DC converter 58 may be implemented as a buck-boost converter is configured to convert the DC rectified voltage $V_{REC}$ from the rectifier 54 to a corresponding DC supply voltage $V_{SUP}$ at a different level. For example, the converter 58 provides the supply voltage $V_{SUP}$ to a corresponding terminal to which an energy storage device may be coupled, demonstrated as supercapacitor $C_{SUP}$. Thus, the converter 58 can store electrical energy in capacitor $C_{SUP}$, which in this example is external to the ASIC 52, to provide the DC supply voltage $V_{SUP}$ at the desired level. The DC supply voltage $V_{SUP}$ is supplied to an ultra-low power LDO 60 that is implemented in the ASIC chip 52. The ultra low power LDO 60 converts the supply voltage to a corresponding regulated voltage demonstrated at $V_{LDO}$. The regulated voltage $V_{LDO}$ is provided via the LDO 60 with low quiescent current, such as to increase power efficiency of the ASIC chip. The sensor 62, in turn, utilizes the bias signal and the regulated voltage $V_{LDO}$ to operate the sensor 62 with increased efficiency. The sensor in turn provides output sensor data to a corresponding output terminal 66 of the ASIC. For example, the output 66 can be coupled with an RF circuit, such as demonstrated in FIG. 1, or other circuitry that can be utilized to wirelessly send the sensor data to a remote device according to an established wireless transmission protocol, such as disclosed herein.

By way of example, assume the ASIC 52 starts in a completely powered-off state with no initial energy stored in all the capacitors and inductors. As energy input (e.g., from energy harvesting device) provides the AC input voltage $V_{in}$, the filter capacitor $C_{filter}$ charges and $V_{rec}$ starts increasing accordingly. Once $V_{rec}$ exceeds a threshold voltage, the on-chip bias generator 56 begins to work, providing bias current and reference voltage for the components (e.g., comparators and amplifiers) of the entire ASIC. With the bias being supplied, the DC-DC converter 58 and LDO regulator 60 also begin operating. As a result, the voltages $V_{sup}$ and $V_{LDO}$ begin to increase (e.g., linearly with the same slope). Once the regulated voltage $V_{LDO}$ reaches a low reference voltage, which is sufficient for powering the on-chip sensor 62, $V_{LDO}$ stops increasing. Additionally, the supply voltage $V_{sup}$ continues to rise until reaching a high reference voltage, which means the supercapacitor has sufficient energy to power the RF transmission module, then the buck-boost converter operates in its steady state mode.

In view of the foregoing, the ASIC 12, 52 thus provides an ultra-low quiescent current architecture power management SoC that is used to implement a sensor node for wireless sensing applications. In some examples, a PMOS process may be utilized to implement the sensor such that it is fully compatible with standard CMOS process. Additionally, since the sensor 20, 62 is fully integrated on-chip with the ASIC 12, 52, the systems disclosed herein provide a complete SoC solution for ultra-low-power wireless sensing (thus obviating cross-chip wire-bonding and multi-chip integration). The following description provides examples of circuitry that may be implemented in the ASIC 12 or 52 to achieve the desired ultra-low power sensing SoC devices.

Rectifier

Figure 3:
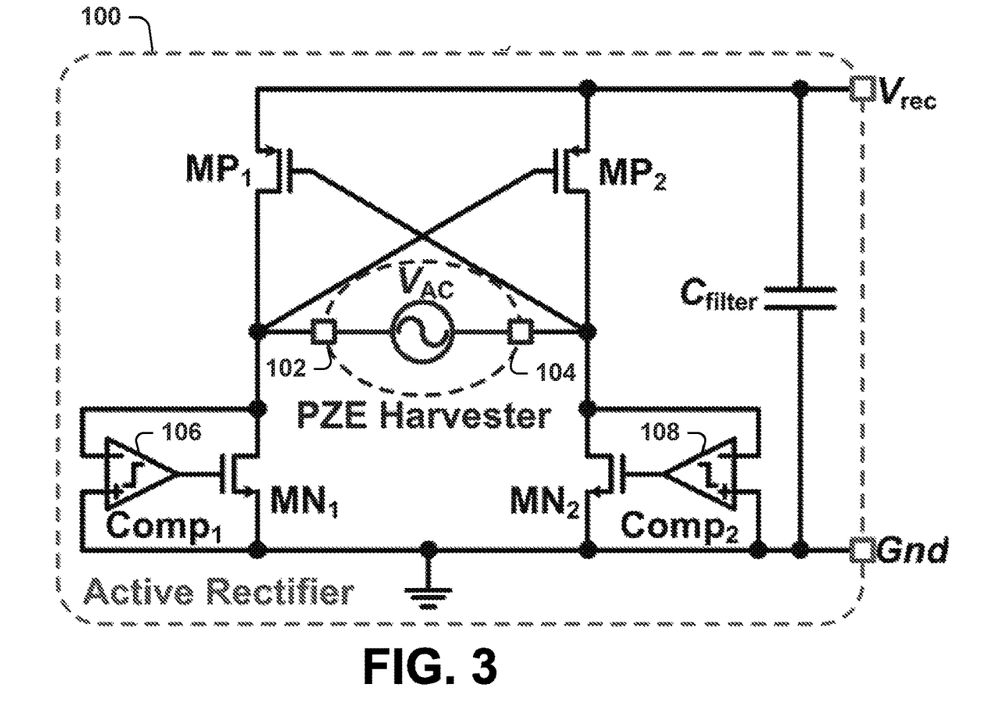
FIG. 3 depicts an example of a rectifier circuit that can be utilized in the system of FIG. 1 or 2.

FIG. 3 depicts an example of a rectifier circuit 100 such as corresponding to a rectifier 14 or 54 in FIGS. 1 and 2, respectively. The rectifier circuit 100 is demonstrated as a full bridge active rectifier that includes an arrangement of transistor switch devices, including a cross-coupled PMOS pair of power switch devices MP1 and $MP_2$ and a pair of NMOS power switch devices $MN_1$ and $MN_2$. For example, the transistor devices $MP_1$ and $MP_2$ are connected between an output terminal coupled to provide the rectified voltage $V_{REC}$ and terminals 102 and 104 coupled across the input AC voltage ($V_{AC}$). In this example, a filter capacitor, $C_{filter}$, is connected between the output node and electrical ground to form a full bridge rectification structure, as shown in FIG. 3.

The NMOS switch devices $MN_1$ and $MN_2$ are connected between the input terminals 102 and 104 and ground. Comparators 106 and 108 are coupled to control the NMOS switch devices $MN_1$ and $MN_2$. For example, the output of each comparator 106, 108 is coupled to the gate of $MN_1$ and $MN_2$, and the inputs of each comparator are connected to the source and drain of $MN_1$ and $MN_2$.

In the example of FIG. 3, the PMOS switches are driven by cross-coupled design because of the high peak-to-peak output voltage $V_{AC}$ and low output current features of the energy source (e.g., a piezoelectric harvester), which can be used to turn on the PMOS transistors with very low drain-source voltage drop. In order to further decrease the drain-source drop voltage (p-n junction) of the NMOS switches, two comparators 106 and 106 are adopted to achieve active gate driving of the NMOS by detecting the voltage difference between the drain and source of the switches continuously.

Figure 4:
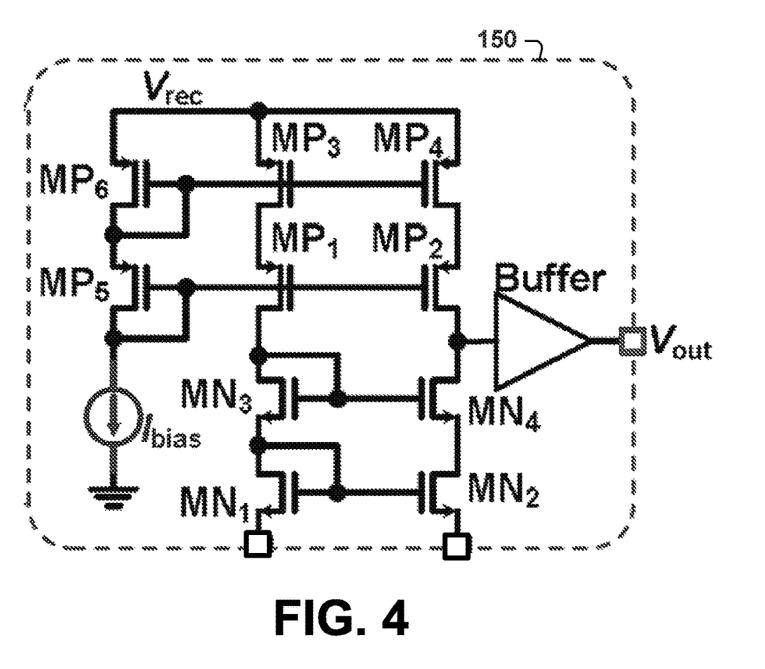
FIG. 4 depicts an example of a comparator circuit that can be utilized in the rectifier of FIG. 3.

FIG. 4 depicts an example of a comparator circuit 150, such as corresponding to the comparator 106, 108 in FIG. 3. Each of the comparators in the rectifier circuit 100 thus is biased by the $I_{bias}$ current that is generated by the bias generator (e.g., bias generator 56 of FIG. 2). As an example, considering environmental low-frequency ambient vibrational energy harvesting scenarios of interest (e.g., with piezoelectric transducers, often lower than 200 Hz in their resonance frequencies), the typical telescopic common gate structure amplifier with sub-threshold operating region is adopted, such that each comparator consumes ultra-low quiescent bias current (e.g., about 40 nA or less), which has attained enough DC gain and nearly 10 kHz unit gain band-width (UGBW) in a wide supply voltage range to guarantee the turn-off of the NMOS on-time.

Converter

Figure 5:
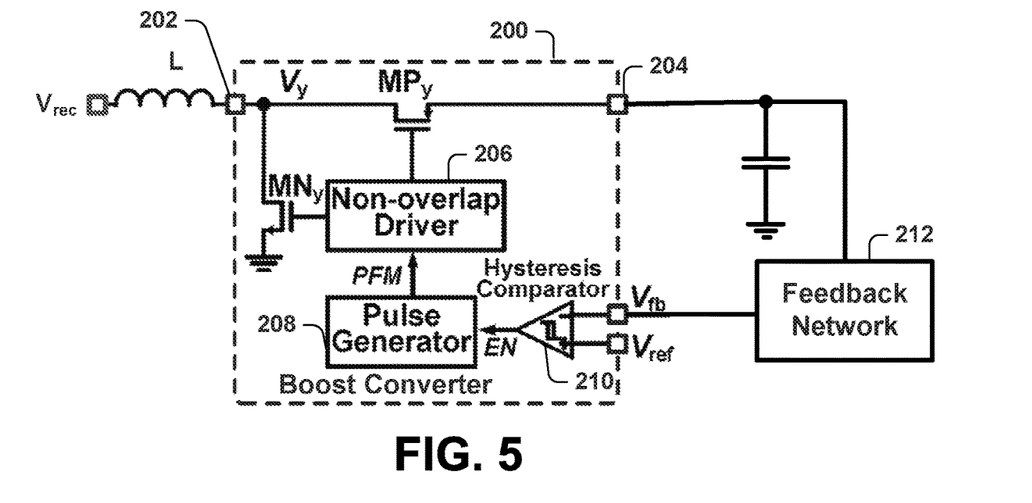
FIG. 5 depicts an example of a boost converter that may be utilized as the power converter of FIG. 1 or 2.

FIG. 5 depicts an example of a boost converter circuit 200, such as corresponding to the DC-DC converter 16 of FIG. 1 or converter 58 of FIG. 2. The boost converter 200 is coupled to receive the rectified voltage $V_{REC}$ (generated by a rectifier such as rectifier 14, 54 or 100). An input of the boost converter 200 thus is coupled to the rectifier voltage via an inductor having an inductance demonstrated at L. The boost converter 200 includes a CMOS power transistor switch devices $MP_Y$ and $MN_Y$. For instance, $MP_Y$ is coupled between the input 202 and output of the boost converter 204. Another power transistor switch device is $MN_Y$ is connected between the input terminal 202 and electrical ground. A driver circuit 206 is connected to the gates of $MP_Y$ and $MN_Y$ to drive the respective transistors in a non-overlap (e.g., mutually exclusive) manner. The driver 206 receives the pulse frequency modulated (PFM) signal from the corresponding pulse generator 208. The pulse generator 208 is activated in response to an enable signal EN that is generated by a comparator 210. The output terminal 204 of the boost converter 200 is connected to an energy storage device, for example, a supercapacitor $C_{sup}$ or another energy storage device. A feedback network 212, which may be external to the ASIC implementing the converter 200, is also connected to the output 204 to provide the corresponding feedback voltage $V_{fb}$ representing the DC supply voltage at 204.

The comparator 210 generates the enable signal based on the supply voltage Vsup relative to a set value. For example, the comparator 210 is an ultra-low-power hysteresis comparator to control the boost converter 200. For instance, comparator 210 compares feedback voltage $V_{fb}$ to the reference voltage, and activates the pulse generator 208 when the supercapacitor $C_{sup}$ needs to be charged. The pulse frequency modulated (PFM) signal output from the generator has a predetermined pulse width (e.g., about 10 μs), which further drives the CMOS switches ($MP_y$ and $MN_y$ in FIG. 5) in a non-overlap mode to charge or discharge the inductor L that is connected at 202. Thus, the boost converter 200 transfers the energy stored in the filter capacitor to charge the supercapacitor (100 mF), even when $V_{sup} > V_{rec}$.

In some examples, the minimum equivalent input impedance of the boost converter is configured to match the energy source (e.g., piezoelectric energy harvester). This enables maximum energy extraction from the energy source, such as in maximum power point tracking (MPPT). Additionally, this boost converter affords extremely low quiescent power dissipation, which is highly desirable for battery-less energy harvesting applications. For instance, quiescent bias current is only required for the hysteresis comparator and another comparator (for realizing zero current detection (ZCD)) inside the non-overlap driving module. Specific to designated applications, the fact that $V_{sup}$ has little variation (together with a suitably chosen trigger window) lowers the performance requirement of the hysteresis comparator, allowing the quiescent current to be significantly lowered. In some examples, the total quiescent current consumption of the boost converter is approximately 15 nA without synchronous driving (e.g., about 10 nA for the hysteresis comparator, and about 5 nA for the ring oscillator in pulse generator), and approximately 55 nA with synchronous driving (e.g., about 10 nA for the hysteresis comparator, about 5 nA for the ring oscillator in pulse generator, and about 40 nA for the ZCD in the non-overlap driver).

Figure 6:
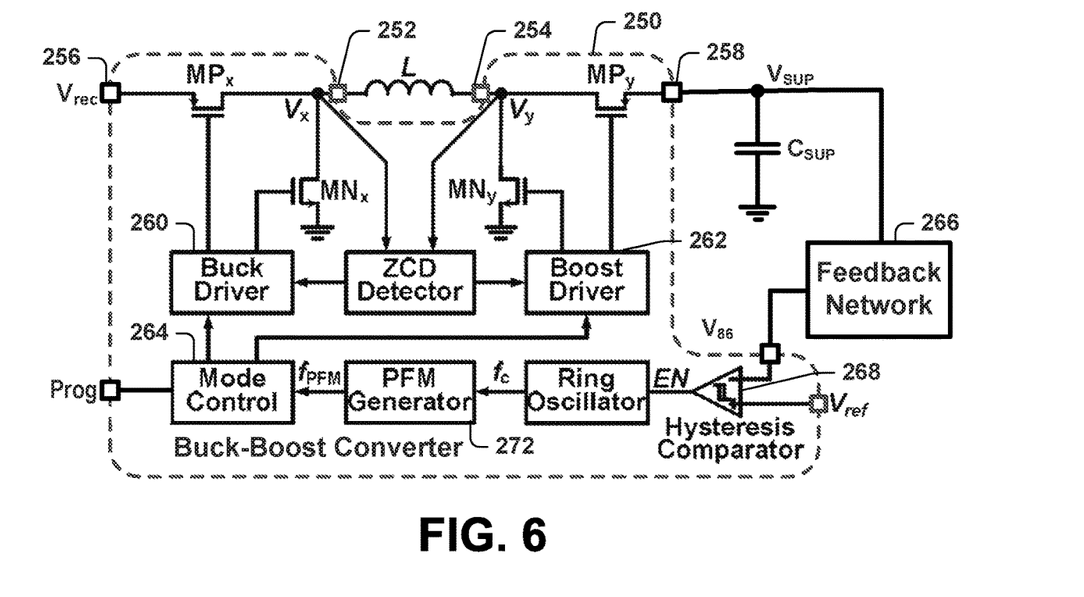
FIG. 6 depicts an example of a buck-boost converter that may be utilized as the power converter of FIG. 1 or 2.

FIG. 6 depicts an example of a buck-boost converter 250 such as corresponding to the DC-DC converter 16 of FIG. 1 or converter 58 of FIG. 2. It is to be understood that in each of the examples of FIGS. 1 and 2, the converter 16 or 58 may be implemented as a boost converter or a buck-boost converter depending upon application requirements, for example. In the example of FIG. 6, an inductor having an inductance, indicated at L, is connected between a pair of inputs 252 and 254. The rectified voltage $V_{rec}$ (e.g., from rectifier 14, 54 or 100) may be provided to another input 256 of the converter 250. A first transistor device $MP_X$ is connected between inputs 256 and 252. Another transistor device $MP_Y$ is connected between the input 254 and the corresponding output 258 of the converter. As in other examples disclosed herein, the energy storage device, demonstrated as supercapacitor $C_{SUP}$ is connected to the output node 258 and ground. The supercapacitor $C_{SUP}$ thus is employed as the energy storage unit to supply the LDO regulator and RF module with electrical power. The converter 250 also includes transistor devices $MN_X$ and $MN_Y$ connected between respective terminals 252 and 254 and ground. Each of the respective terminals 252 and 254 provide a corresponding voltage $V_X$ and $V_Y$, respectively.

The converter 250 includes a buck driver that is connected to the gates of $MP_X$ and $MN_X$. The buck driver is operative in the buck operating mode to control transistors $MP_X$ and $MN_Y$ for supplying or sending current relative to the inductor L. In the boost operating mode, boost driver 262 operates to control the gates of transistor devices $MP_Y$ and $MN_Y$. Each of the buck driver 260 and boost driver 262 is controlled by mode control block 264. Mode control block 264 thus operates the converter in the buck or boost mode in response to a program (PROG) input such as from an external controller or register that may be set in response to a user input. For instance, the mode control 264 is used to realize the buck, buck-boost, or boost topology modes in different input/output voltage ranges. Additionally, a zero current detector 265 is connected to terminals 252 and 254 to detect instance when the inductor current is zero (e.g., does not flow) between the terminals and, in turn provide, an indication of the zero current condition to each of the buck or boost driver 260 and 262, respectively.

For example, the zero current detector 265 is designed to control the off state of the synchronous rectifying switches (e.g., $MN_X$ and $MP_Y$), so as to prevent formatting of the reverse inductor current after the inductor current decreases to zero. Both the buck driver 260 and boost driver 262 (including a level shifter to regulate the amplitude of the driving signal for $MP_Y$) are designed to generate the non-overlapping drive signals with enough drive capability to control the on/off states of the power switches.

As part of the control loop configured for selectively activating the converter 250, a feedback network 266 is connected to the output terminal 258 to provide a corresponding feedback signal $V_{fb}$ representing the supply voltage $V_{sup}$. For example, the feedback network 266 may be a divider network (e.g., a resistor or capacitor divider). The feedback voltage $V_{fb}$ is provided to an input of the comparator 268. Another input of the comparator receives the reference voltage $V_{REF}$. To further reduce the quiescent current consumption, the comparator 268 in turn provides an enable (EN) signal to ring oscillator 270 to control the on/off states of the bias current of other modules (e.g., the ring oscillator and the ZCD detector).

For example, the Buck-Boost converter 250 employs the hysteresis comparator to generate the enable signal EN by comparing the feedback voltage $V_{fb}$ with reference voltage $V_{ref}$ continually during operation, to control the operation of the ring oscillator 270. When $V_{fb} > V_{ref}$, which means the supply voltage $V_{sup}$ on the supercapacitor reaches the preset desired value, EN=0, thus $f_c=0$, no $f_{PFM}$ signal output and all the power switches are kept turned-off. When $V_{fb} < V_{ref}$, which means the voltage $V_{sup}$ on the supercapacitor is lower than the preset value, EN=1, thus $f_c$ outputs as clock signal, $f_{PFM}$ signal controls the on/off states of power switches of the Buck-Boost converter.

The ring oscillator 270 is thus enabled in response to the feedback voltage being less than the prescribed reference voltage which is generated by the bias generator as disclosed herein. The ring oscillator 270 in turn provides the clock signal $f_c$ having a prescribed frequency, which can be set based on the configuration of the ring oscillator 270. The clock signal $f_c$ is provided to a PFM generator 272 to in turn provide the pulse frequency modulated signal $f_{PFM}$ to mode control 264 with proper pulse width based on $f_c$. In some examples, the pulse width and maximum frequency of the PFM signal $f_{PFM}$ is designed to be adjustable (e.g., in response to setting a variable capacitance in the ring oscillator). Because the frequency of the PFM signal is equal to the frequency of the clock signal $f_c$, the adjustability of $f_{PFM}$ means $f_c$ is also adjustable.

Figure 7:
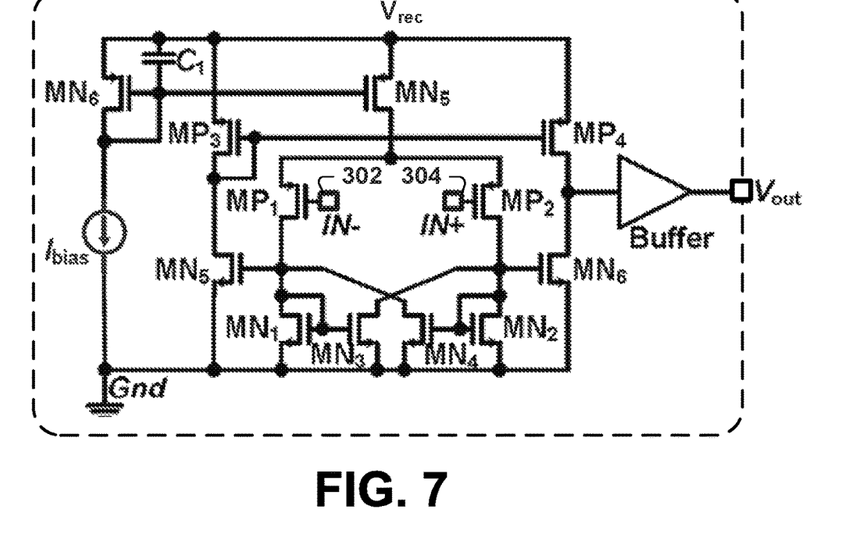
FIG. 7 depicts an example of a hysteresis comparator that can be utilized in the converter of FIG. 6.

FIG. 7 depicts an example of a hysteresis comparator 300, such as may be utilized as comparator 210 or 268 in the converter circuits. The comparator 300 is connected between supply voltage rail $V_{rec}$ and electrical ground. The comparator receives a bias current $I_{bias}$, which may be generated by bias generator 56. The comparator 300 includes an inverting input 302 and a non inverting input 304. The inverting input may be coupled to receive a feedback voltage and a non inverting input may be connected to receive a reference voltage $V_{REF}$ such as disclosed herein. The example transistor implementation of the hysteresis comparator of FIG. 7 consumes ultra-low (e.g., 10 nA or less) quiescent bias current with sub-threshold operating region, and has a nearly 20 mV trigger window voltage to a UGBW of several hundred Hz, as well as an output voltage thereby mitigating ripples for the buck-boost converter 250.

LDO Regulator

Figure 8:
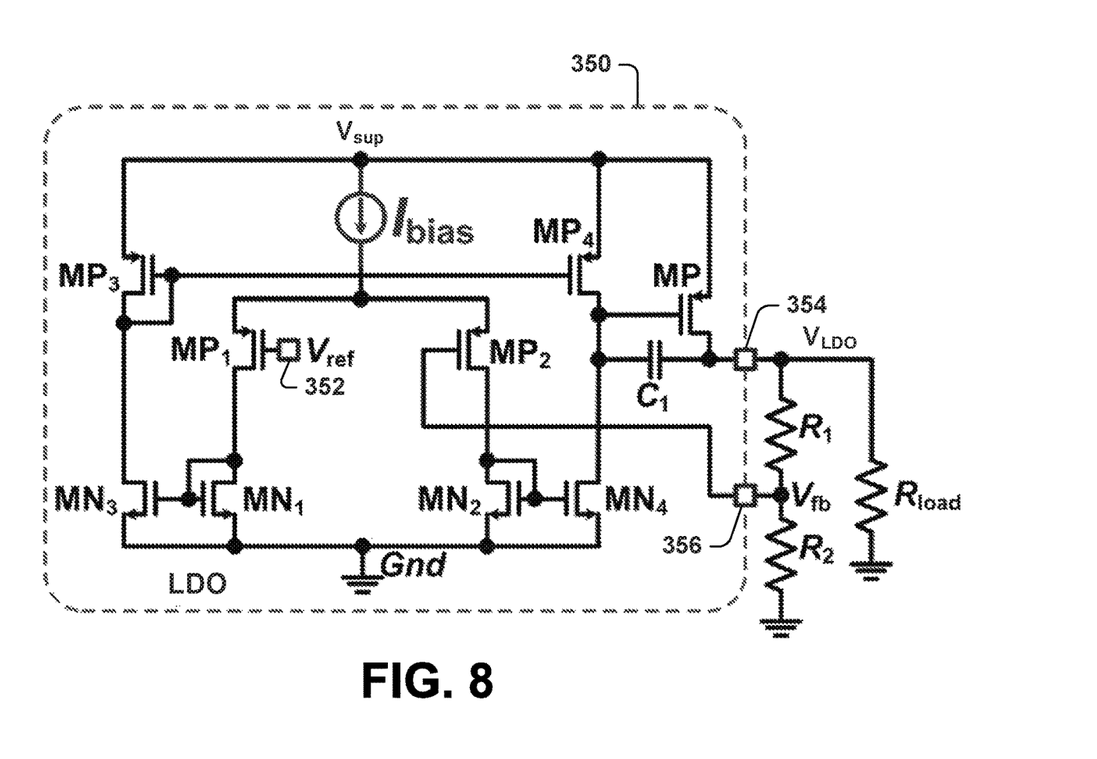
FIG. 8 depicts an example of a low drop-out regulator that can be utilized as the LDO of FIG. 1 or 2.

FIG. 8 depicts an example of an LDO circuit 350 that can be utilized to supply a fixed DC regulated (e.g., clean) output voltage $V_{LDO}$ at an output thereof 354. The LDO in this example, is a two-stage common-source amplifier that includes on-chip capacitor, $C_1$, as a compensation capacitor to provide loop stability. The LDO 350 is connected between the supply rail $V_{SUP}$ and ground, and is biased by bias generator, such as via the $I_{bias}$ current and the reference voltage $V_{REF}$ which is provided to a corresponding input 352. The LDO thus provide a second stage of power conversion to supply the voltage $V_{LDO}$ to the internal sensor based on the electrical energy stored in the energy storage element (e.g., by DC-DC converter 16, 58, 200 or 250). For example, the electrical energy stored in $C_{sup}$ may be represented as $E_{sup} = \frac{1}{2} C_{sup} V^2_{sup}$, where $V_{sup}$ is the voltage of the supercapacitor $C_{sup}$ and also the output voltage of the buck-boost converter.

A feedback circuit, which is demonstrated as a resistive divider circuit of resistors $R_1$ and $R_2$, provides corresponding feedback voltage $V_{fb}$ at an input 356, representing the regulated output voltage $V_{LDO}$. The feedback voltage $V_{fb}$ is coupled to drive a gate of a power switch device $MP_2$. The LDO circuit 350 thus uses the feedback voltage $V_{fb}$ and the reference voltage $V_{ref}$ at 352 to maintain the regulated output voltage $V_{LDO}$ at a desired level. The fixed DC regulated output voltage $V_{LDO}$ at 354 may be supplied to the on-chip sensor (e.g., sensor 20, 62 of FIG. 1 or 2), such as long as $V_{sup}$ exceeds a predetermined value. The CMOS design of the LDO 350 of FIG. 8 thus affords low noise and low ripples voltage to the load, and has an ultra-low quiescent current. As an example, the total quiescent current consumption of the designed LDO may be approximately 750 pA (e.g., about 250 pA for $I_{bias}$, and about 500 pA for $MP_3$ and $MP_4$) to realize sub-threshold operating regime with high DC gain and to achieve load current range from about 10 nA to 100 μA.

Bias Generator

Figure 9:
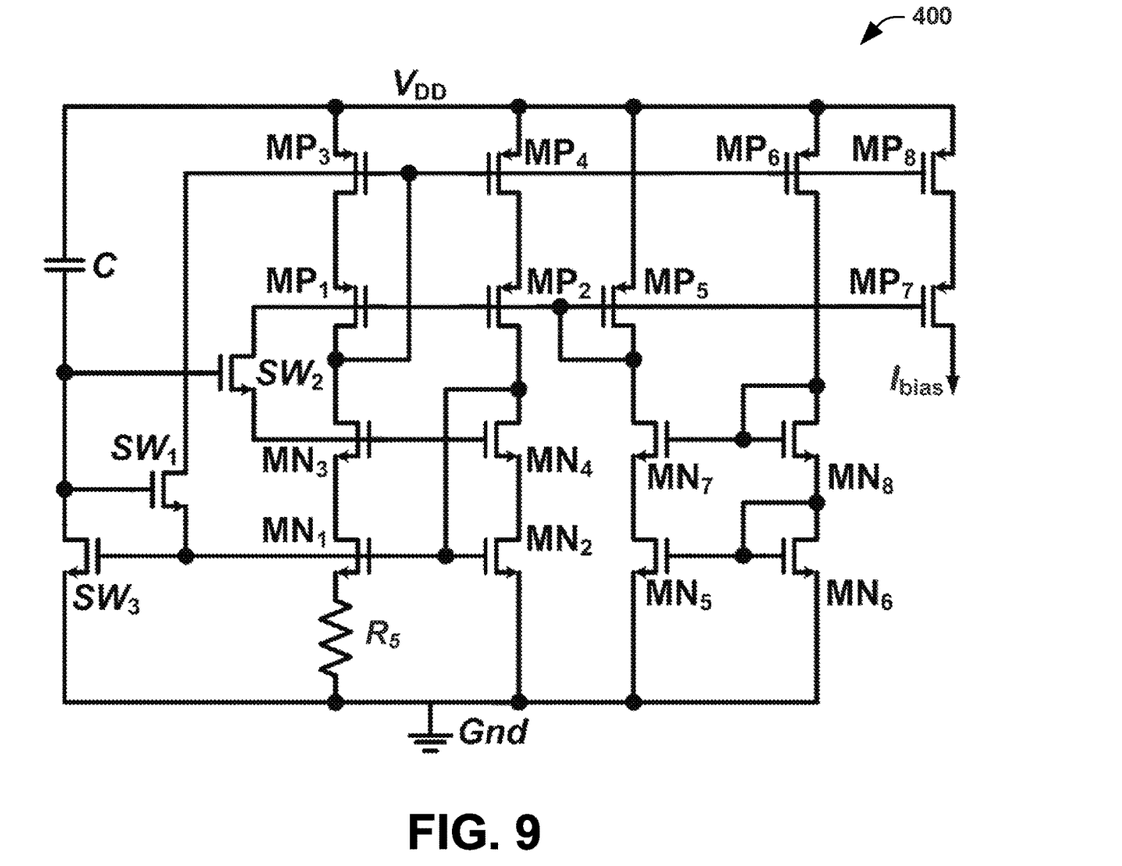
FIG. 9 depicts an example of a bias generator that can be utilized in the ASIC of FIG. 1 or 2.

FIG. 9 depicts an example of a bias generator circuit 400 that can be utilized to provide a bias current $I_{bias}$ such as disclosed herein. This bias circuit 400 includes an arrangement of transistor devices, as shown, that are activated to generate current through an internal resistor demonstrated at $R_5$. The current is mirrored through an arrangement of transistor devices to a corresponding output transistor $MP_7$ that is controlled to provide the output $I_{bias}$ current. The bias current $I_{bias}$ may be provided via a terminal (not shown) to a predetermined resistor (e.g., an external resistor) to provide a corresponding reference voltage ($V_{ref}$) that may be utilized by other on-chip circuitry (e.g., comparators and amplifiers) in the ASIC disclosed herein. As an example, the total quiescent current for this part of the circuit may be about 40 nA, and provides 10 nA current bias to all the other modules on the ASIC.

Figure 10:
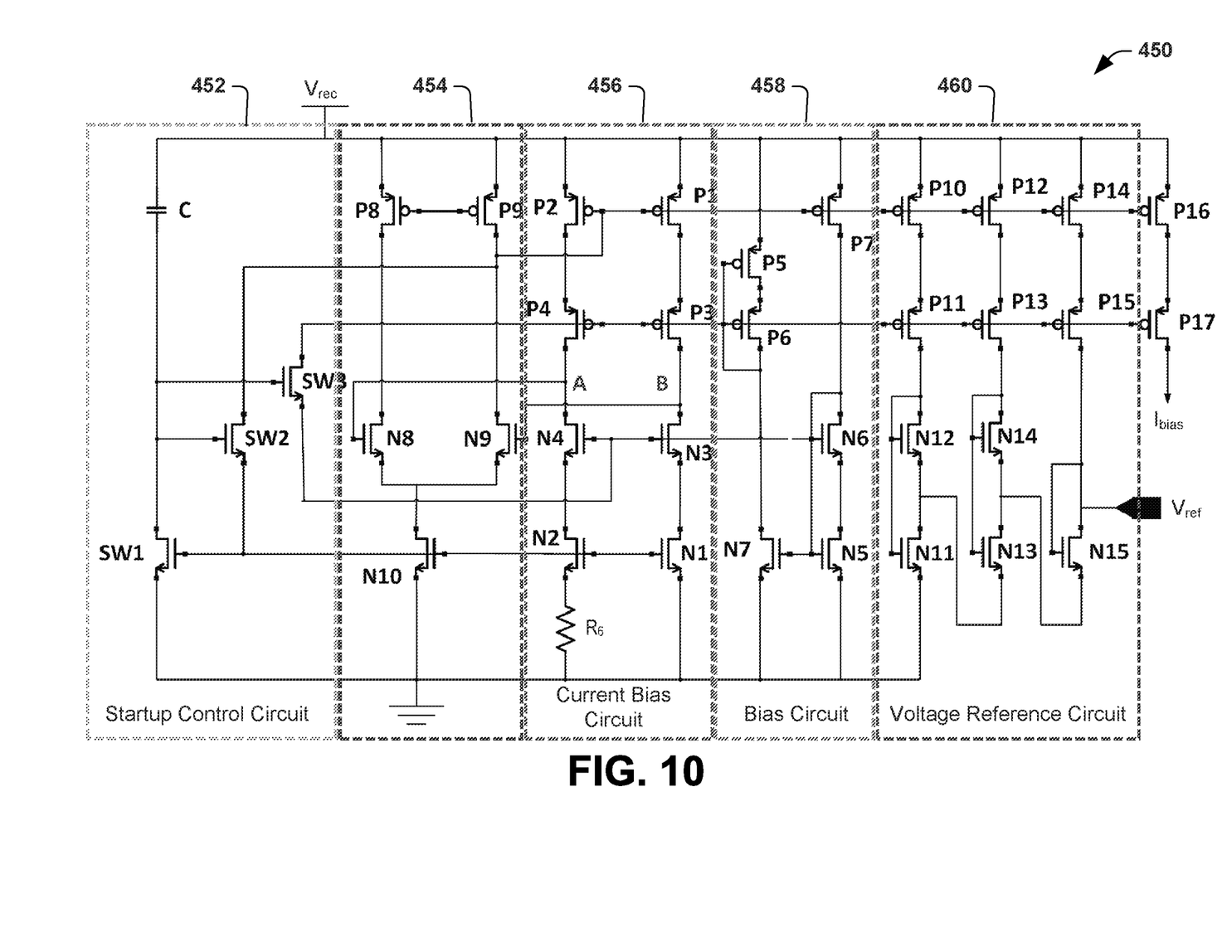
FIG. 10 depicts an example of another bias generator that can be utilized in FIG. 1 or 2.

FIG. 10 depicts an example of another bias generator circuit 450 that can be utilized to provide a bias, including bias current $I_{bias}$ and a corresponding reference voltage $V_{REF}$ for the ASIC, such as a bandgap reference to provide increased stability over a range of temperatures. The bias generator 450 includes a startup control circuit 452 that is coupled between the rectified voltage rail $V_{REC}$ to control charging and discharging a capacitor. For example, the control circuit 452 controls charging the capacitor through transistor switch devices (SW1, SW2 and SW3) to begin generating current. Once the current reaches a predetermined level, the capacitor will be discharged and transistor switch devices (SW1, SW2 and SW3) turned off, such as for providing power to other portions of the circuit 450. For example, the startup control circuit is connected to an OP AMP circuit 454 that drives a current bias circuit 456. For example, current bias circuit 456 includes corresponding nodes A and B that drive inputs to the OP AMP 454 circuit (e.g., gates of N8 and N9) to in turn control current through an internal resistor $R_6$ as activated by the switch devices of the startup control circuit 452. The current through the internal resistor $R_6$ is mirrored through the network of transistor devices to a corresponding output transistor P17 to provide the bias current $I_{bias}$.

The bias generator 450 also includes an internal bias circuit 458 that is connected between the current bias circuit 456 and bandgap voltage reference circuit 460. The internal bias circuit 458 includes a self-biased cascade configuration of transistors devices (e.g., N5-N6 NMOS pair are configured as self-biased wide swing cascode connection, and P5-P6 PMOS pair are configured as a self-biased wide swing cascode connection). This enables efficient energy transfer from the current bias circuit 456 to the voltage reference circuit 460. The bandgap voltage reference circuit 460 includes an arrangement of transistor devices that utilize the mirrored bias current (via the bias circuit 458) to generate the corresponding DC reference voltage $V_{REF}$ that is provided to bias circuitry within the ASIC (e.g., the DC-DC converter and LDO).

By way of example, the bias generator circuit 450 requires a lower startup voltage from the rectifier to generate stable bias signals for operation of associated circuitry. As a result, the ASIC is able to harvest electrical energy from weaker sources. This is achieved by configuring bias generator circuit 450, as shown, and facilitated by better device sizing of devices in the current bias circuit 456 and using a self-biased wide swing cascode in circuit 458.

Additionally, the bias generator circuit affords enhanced line regulation in the ASIC in response to the AC input signal from an energy harvester device, such as a piezoelectric harvester. For instance, the input energy source (an energy harvester) may not supply consistent and persistent electrical input $V_{in}$; for example, sometimes the amplitude is high and sometimes the amplitude is low. The op-amp circuit 454 (e.g., N8-10 and P8-9) is configured to enhance the line regulation of this startup circuit. For example, the op-amp helps bring node A voltage close to the voltage at node B, so that the potential between A and B is independent to the variation of supply voltage Vrec (from the rectifier). This isolation further helps stabilize the voltage cross the resistor R in the bias current circuit 456 and, therefore, generate a stable current that has better line regulation.

Additionally, the bandgap voltage reference circuit 460 is configured with low power consumption and high driving capability. In the example of FIG. 9, the reference voltage is generated from a current source flowing through a large external resistor (e.g., 120 M-Ohm), such that the impedance of this voltage reference is high and will be loaded by the following circuit stage. By way of comparison, the bias generator 450 of FIG. 10 provides a reduced bias current generated (e.g., down to about 2.5 nA compared to about 10 nA for the bias generator 400). This will decrease the overall ASCI quiescent current consumption.

Figure 11:
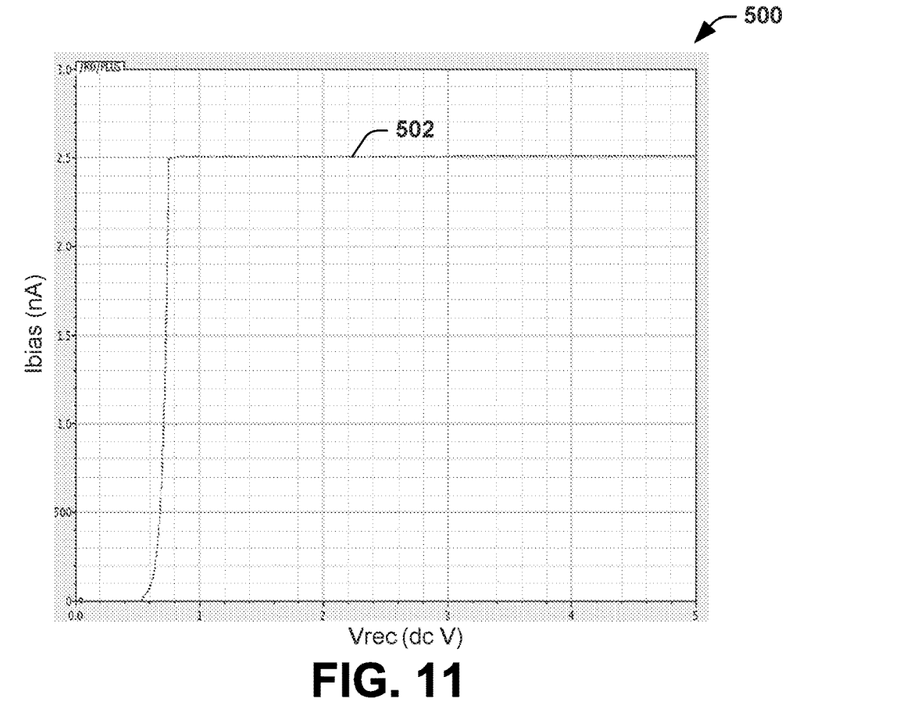
FIG. 11 is a graph depicting an example of bias current as a function of an input supply voltage.

As a further example, FIG. 11 depicts an example of a graph 500 demonstrating the bias current 502 that is generated (e.g., by bias generator 450) as a function of the rail voltage $V_{rec}$. As demonstrated in the example of FIG. 11, the bias current Ibias reaches its desired constant current value (e.g., about 2.5 nA) at approximately 0.8 volts for its supply voltage $V_{rec}$.

Figure 12:
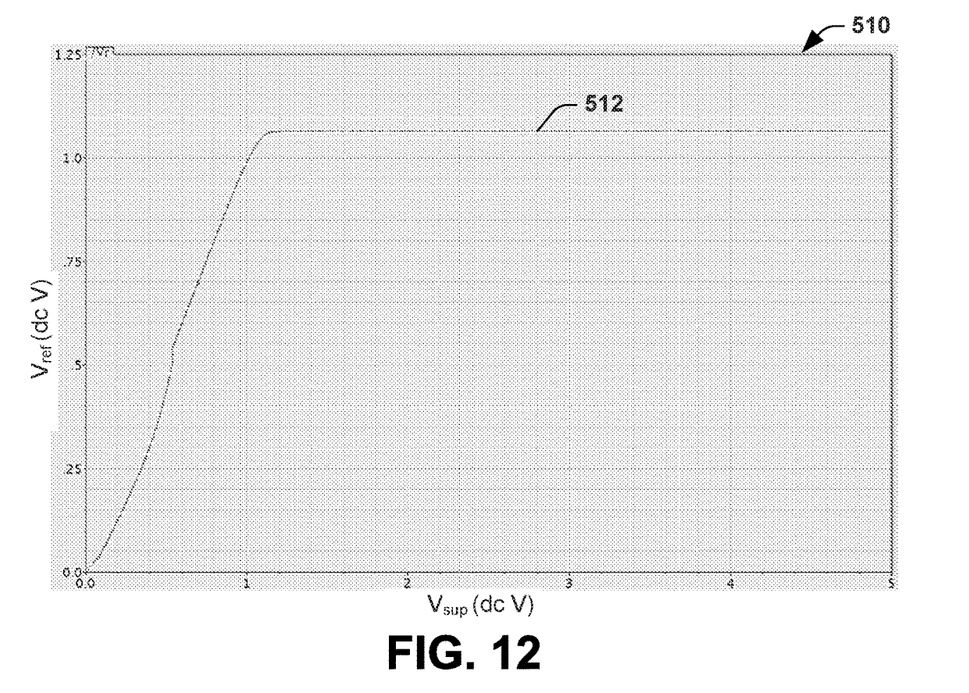
FIG. 12 depicts an example of a reference voltage that is generated as a function of an input supply voltage.

FIG. 12 depicts an example of another graph 510 demonstrating the output reference voltage $V_{REF}$ that is generated (e.g., by bias generator 450) as disclosed herein. In the example of FIG. 12, the reference voltage 512 reaches its constant voltage value of about 1.1 volts and a supply rail voltage $V_{rec}$ reaches about 1.1 volts thus. FIGS. 11 and 12 thus demonstrate enhanced line regulation resulting from the arrangement of circuitry that provides the bias generator 450, such as including the OP AMP circuitry 454.

System Architecture

Figure 13:
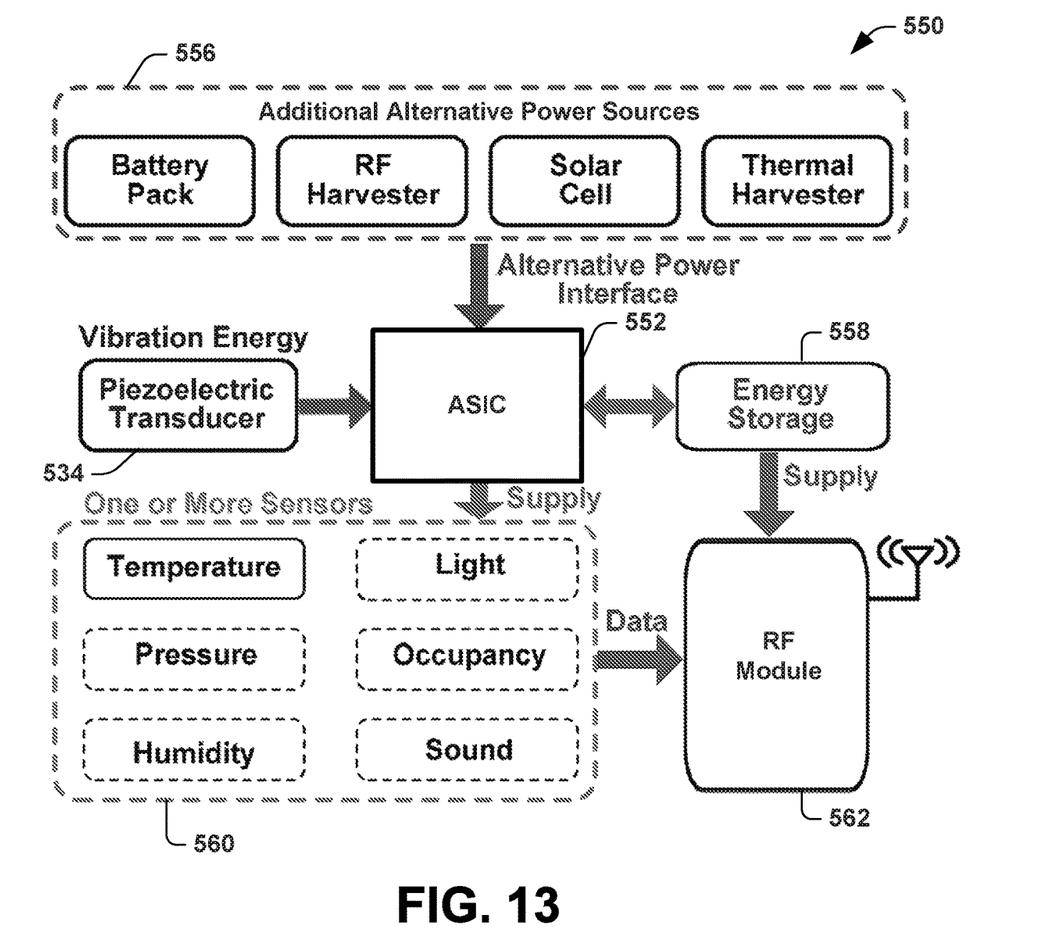
FIG. 13 depicts an example of a system architecture for a wireless sensor network.
Figure 14:
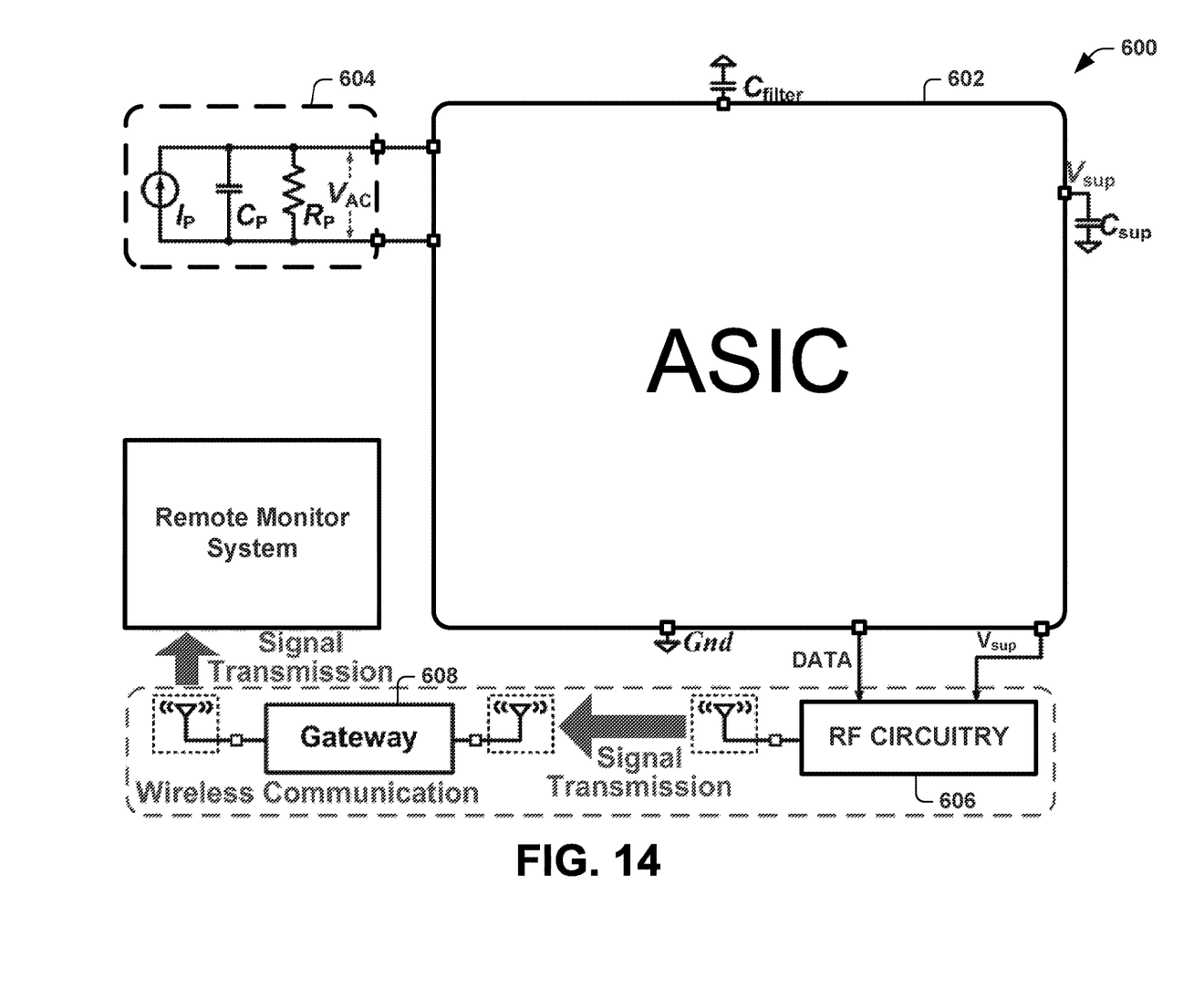
FIG. 14 depicts an example of another system architecture for a wireless sensor network.

FIGS. 13 and 14 depict examples of system architectures that may be implemented using an ASIC (e.g., ASIC 12 or 52) as disclosed herein. Each of the systems in FIGS. 13 and 14 include a sensor integrated on the ASIC. To minimize the power consumption of the wireless sensor node, the sensor may be implemented as an ultra-low-power module that is powered by a regulated voltage (e.g., from a multi-stage power converter). For example, the sensor may be fabricated as a CMOS sensor using PMOS processing, such that it is fully compatible with standard CMOS process using Pcomp (instead of requiring more expensive special processes such as SOI). Additionally or alternatively, the sensor may be fully integrated in the ASIC, thereby to provide self-powering, wireless sensing applications as disclosed herein.

FIG. 13 depicts an example of a wireless sensor system 550 that includes an ASIC 552, such as corresponding to ASIC 12 or 52 disclosed herein. In the example of FIG. 13, the ASIC 552 is coupled to receive an AC input voltage $V_{IN}$ from an energy harvesting device, demonstrated as a piezoelectric transducer 554. The energy harvester may be a PZE transducer, converting vibration energy from the environment into electrical energy, such as disclosed in PCT Publication No. WO 2017/117247, which is incorporated herein by reference. In some examples, one or more additional alternative power sources 556 may also be electrically connected to supply alternative input power to the ASIC 552 through a corresponding electrical interface. In the example of FIG. 13, the alternative power sources are demonstrated as including a battery pack, RF harvester, solar cell, and/or thermal harvester. Any one or more of such power sources may be utilized to supply an input power to the ASIC 552.

The ASIC 552 is configured to manage (e.g., convert) the energy received from the transducer 554 and/or one or more additional power sources 556 and store corresponding energy in an energy storage device 558. For example, the energy storage element 558 may be implemented as a supercapacitor (e.g., $C_{sup}$) or a rechargeable battery, such as to provide corresponding supply voltage for the ASIC and other associated circuitry. The ASIC powers each sensor type individually with a tunable voltage range. This associated may be external to the ASIC 552, including an RF module 562. The ASIC 552 in turn utilizes the stored energy (e.g., a regulated voltage) and convert it to clean regulated power that can be supplied to one or more sensors 560.

In the example of FIG. 13, the one or more sensors may include a temperature sensor, pressure sensor, humidity sensor, light sensor, occupancy sensor or sound sensor. Other sensors may also be utilized. Additionally, while on the example of FIG. 13 the sensors are demonstrated as external to the ASIC 552, in other examples (e.g., FIG. 14, such one or more sensors may be implemented within the ASIC to provide a low power application specific device). In the example of FIG. 13, the one or more sensors each provides corresponding sensor data representing the commission sense by the sensor, (e.g., temperature, pressure, humidity, light, occupancy of sound) to the radio frequency module 562. As mentioned, the RF module 562 utilizes the supply voltage from the energy storage 558 to transmit the data according to a wireless transmission protocol via an antenna. For example, the RF module 562 monitors the voltage level in the energy storage 558 to determine a rate for sensor data transmission. The RF module 562 may be part of a transceiver that provides bidirectional communications or it may be configured for transmission only. A corresponding receiver (not shown, but see FIG. 14) may receive the data, store the data, and process the data for implementing a variety of functions, which may include aggregation with other data and retransmission of the data to one or more transceivers.

FIG. 14 depicts an example of another system 600 such as corresponding to a wireless sensor network and monitoring system. The system 600 includes an ASIC 602, such as corresponding to the ASIC 12 or 52 disclosed herein. The ASIC 602 thus includes an input to receive an AC input voltage such as from an energy harvester 604, such as a piezoelectric harvester 604 disclosed in the above-incorporated PCT Publication No. WO 2017/117247.

As disclosed herein, the ASIC is configured to rectify (e.g., by rectifier 14, 54, 100) the AC input voltage $V_{AC}$ to provide a corresponding rectified voltage to associated circuitry. For example, the rectified voltage may be filtered via the external filter, such as a capacitor $C_{filter}$. The rectified voltage may be supplied to a DC-DC converter (e.g., converter 16, 58, 200, 250) that is configured to convert the rectified voltage to a corresponding supply voltage, which that may be stored in an energy storage device, demonstrated in the example of FIG. 14 as an external supercapacitor $C_{SUP}$. The stored energy may be supplied as a corresponding DC voltage to internal as well as external components of the ASIC 602. The ASIC further may be configured (e.g., bias generator 56, 400, 450) to generate the bias current and reference voltage that are utilized by the internal circuitry as part of the power conversion and voltage regulation processes implemented by the circuitry. Another converter (e.g., an ultra-low power LDO (e.g., 18, 60, 350) to generate clean regulated voltage that is utilized to power one or more on-chip sensors such as disclose herein. The sensor thus can utilize the regulated voltage to sense a corresponding condition, such as associated with the environment in which the ASIC 602 is placed. The ASIC 602 may be electrically connected with an RF circuit 606 to supply data and a supply voltage $V_{SUP}$ to the RF transmitter. The RF circuit 606 may include or be connected to an antenna to transmit a wireless signal. For example, the wireless signal may be transmitted according to one of a variety of wires protocols, such as disclosed herein. The RF circuit 606 may be part of a transceiver that provides bidirectional wireless communications or it may be configured for wireless transmission only.

The corresponding gateway 608 may include an antenna on circuitry configured to receive the wireless signal from the RF circuit 606. The gateway will in turn send the signal via a network to a monitoring station which may be remote relative to where the gateway is located. In some examples, the gateway 608 may receive wireless signals transmitted from a plurality of wireless sensor nodes, aggregate the sensor data from the nodes and provide a corresponding signal transmission to a remote monitor system (e.g., a computer, such as desktop, tablet or smart phone). The monitor system 610 may process the information for a variety of purposes, such as analysis and reporting or implementing related control functions based on the sensor data from a number of sensor nodes. In some examples, the monitor system 610 is remote from the gateway 608. In other examples, the monitor system 610 may be connected to the gateway via a physical connection such as for a local processing of the sensor data. In some examples, the RF circuit 606 and gateway 608 both may be configured as transceivers for bi-directional communication in a network, such as thereby enabling control of sensor activity and programming of the ASIC (e.g., via a user input device at the remote monitoring system).

In view of the foregoing, it is appreciated that an ASIC may be configured to provide a clean supply voltage (e.g., using the energy stored in a supercapacitor) with low ripples and low noise, such for powering one or more sensors (e.g., sensor nodes) such as disclosed herein. For example, the ASIC may include a monolithic, ultra low-power (e.g., nano-Watt (nW)) sensor integrated on-ASIC that outputs the sensor signal in digital form for transmission.

The power management ASIC system is configured to reduce both quiescent and dynamic power consumption compared to existing designs. Quiescent power is a product of the sum of the quiescent bias currents of the bias generator, amplifier, comparator, oscillator, and the feedback resistance network (buck-boost converter and LDO regulator). Thus, reducing the usage of the above mentioned components or modules and decreasing the value of bias current can lower quiescent power consumption significantly. For example, the designed bias current in the ASIC may be less than or equal to about 10 nA, such as about 2.5 nA or even lower. Dynamic power consumption is mainly generated by the oscillator, PFM signal generator, drivers, conduction loss of the power switches in buck-boost converter and rectifier, and active control of the full bridge rectifier. Thus, the buck-boost converter and active full bridge rectifier designs disclosed herein help reduce the dynamic power effectively. For buck-boost converter design, the key parameters for optimizing are the turn-on period of the power switches, peak inductor current and frequency of the PFM signal.

For the example of self-powering PZE vibration harvester applications, the buck-boost converter usually operates in its discontinuous conduction mode (DCM). In this condition, The PFM conducting time is fixed, and in stable operations, the energy through buck-boost converter is discretized into equal amount. Without considering the quiescent power consumption, the energy conversion efficiency of the buck-boost converter is constant. Therefore, optimization of dynamic power consumption within a single PFM period is essential for improving the energy conversion efficiency of the buck-boost converter. For the full bridge rectifier, because of the low frequency of the PZE harvester, the variation rate of the current is very small, even in reverse. Thus the precision of turn-off time of the active control can be reduced, which decreases both quiescent bias current of the comparators and the drive ability. All these and other considerations can help improve the energy conversion efficiency of the ASIC power management system.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
    a rectifier having an input configured to receive an AC input voltage and convert the AC input voltage to a rectified output voltage;
    a power converter having an input coupled to receive the rectified output voltage and to provide a DC supply voltage at an output thereof;
    a low drop-out regulator having an input coupled to receive the DC supply voltage, the low drop-out regulator being configured to provide a regulated voltage based on the DC supply voltage;
    a sensor coupled to receive the regulated voltage as a power source, the sensor configured to sense a condition and provide sensor data indicative of the sensed condition;
    an application specific integrated circuit (ASIC) that includes the rectifier, the power converter and the low drop-out regulator and the sensor;
    a filter capacitor connected to a first terminal of the ASIC that is coupled with the rectified output voltage;
    an energy storage device connected to a second terminal of the ASIC that is coupled with the DC supply voltage; and
    a bandgap voltage reference generator connected to receive the rectified output voltage, the bandgap voltage reference generator configured to generate a reference voltage within the ASIC based on a bias current.

2. The system of claim 1, further comprising a bias generator having an input coupled to receive the rectified output voltage, the bias generator configured to generate the bias current that is supplied to the power converter, the low drop-out regulator and the sensor.

3. The system of claim 2, wherein the bias generator further comprises a current bias generator circuit connected to the rectified output voltage and configured to generate the bias current.

4. The system of claim 3, wherein the bias generator further comprises:
    a startup control circuit connected to the rectified output voltage and configured to activate the bias generator; and
    an op-amp circuit coupled to the startup control circuit and to receive the rectified output voltage, the op-amp circuit configured to regulate a pair of voltages independent of variation in the rectified output voltage, the current bias generator circuit generating the bias current based on the regulated pair of voltages.

5. The system of claim 1, wherein the power converter comprises a boost converter or a buck-boost converter.

6. The system of claim 5, wherein the buck-boost converter further comprises a hysteresis comparator to control power conversion based on a predetermined reference voltage and a feedback signal, corresponding to the DC supply voltage.

7. The system of claim 1, wherein the rectifier is configured as a full-bridge active rectifier that includes hysteresis comparators to control clamping of the rectified output voltage if the rectified output voltage exceeds a threshold voltage.

8. The system of claim 1, further comprising a radio frequency transmitter coupled to a third terminal of the ASIC to receive the sensor data, the radio frequency transmitter configured to send the sensor data wirelessly, wherein the system defines a sensor node.

9. A system comprising:
a rectifier having an input configured to receive an AC input voltage and convert the AC input voltage to a rectified output voltage;
a power converter having an input coupled to receive the rectified output voltage and to provide a DC supply voltage at an output thereof;
a low drop-out regulator having an input coupled to receive the DC supply voltage, the low drop-out regulator being configured to provide a regulated voltage based on the DC supply voltage;
a sensor coupled to receive the regulated voltage as a power source, the sensor configured to sense a condition and provide sensor data indicative of the sensed condition;
a bias generator having an input coupled to receive the rectified output voltage, the bias generator configured to generate a bias current that is supplied to the power converter, the low drop-out regulator and the sensor, wherein the bias generator further comprises:
 a current bias generator circuit connected to the rectified output voltage and configured to generate the bias current;
 a startup control circuit connected to the rectified output voltage and configured to activate the bias generator;
 an op-amp circuit coupled to the startup control circuit and to receive the rectified output voltage, the op-amp circuit configured to regulate a pair of voltages independent of variation in the rectified output voltage, the current bias generator circuit generating the bias current based on the regulated pair of voltages; and
 a reference voltage generator connected to the rectified output voltage, the reference voltage generator being coupled with the current bias generator circuit and configured to generate a reference voltage based on the bias current, the reference voltage being supplied to the power converter and the low drop-out regulator.

10. The system of claim 9, wherein the low drop-out regulator is configured to provide the regulated voltage to the sensor based on the DC supply voltage, the bias current and the reference voltage.

11. A system comprising a sensor node, the sensor node comprising:
an energy harvester module configured to convert ambient energy into an electrical signal;
a power management application specific integrated circuit (ASIC) comprising:
a rectifier having an input connected to receive the electrical signal, the rectifier configured to convert the electrical signal to a rectified voltage;
a DC-DC converter having an input coupled to receive the rectified voltage and to provide a DC supply voltage at an output thereof, wherein the DC-DC converter is a buck-boost converter, which comprises a hysteresis comparator to control power conversion based on a predetermined reference voltage and a feedback signal, corresponding to the DC supply voltage;
a low drop-out regulator coupled to receive the DC supply voltage and provide a regulated voltage; and
a sensor coupled to receive the regulated voltage, the sensor is configured to sense a condition and provide sensor data indicative of the sensed condition;
a radio frequency module configured to wirelessly transmit the sensor data; and
a reference voltage generator connected to receive the rectified voltage, the reference voltage generator configured to generate the regulated reference voltage within the ASIC based on a bias current.

12. The system of claim 11, wherein the rectifier is configured as a full-bridge active rectifier that includes a hysteresis comparator to control clamping of the rectified voltage if the rectified voltage exceeds a threshold voltage.

13. The system of claim 11, further comprising:
a filter capacitor connected to a first terminal of the ASIC that is electrically coupled with the rectified voltage; and
an energy storage device connected to a second terminal of the ASIC that is electrically coupled with the DC supply voltage.

14. The system of claim 11, wherein the ASIC further comprises a bias generator having an input coupled to receive the rectified voltage, the bias generator configured to generate at least one bias that is supplied to the DC-DC converter, the low drop-out regulator and the sensor.

15. The system of claim 14, wherein the bias generator further comprises:
a current bias circuit connected to the rectified voltage and configured to generate the bias current that is supplied to the sensor, the DC-DC converter and the low drop-out regulator;
a startup control circuit connected to the rectified voltage and configured to activate the bias generator; and
an op-amp circuit coupled to the startup control circuit and to receive the rectified voltage, the op-amp circuit configured to regulate a pair of voltages independent of variation in the rectified voltage, the current bias circuit generating the bias current based on the regulated pair of voltages.

16. A system comprising a sensor node, the sensor node comprising:
an energy harvester module configured to convert ambient energy into an electrical signal;
a power management application specific integrated circuit (ASIC) comprising:
a rectifier having an input connected to receive the electrical signal, the rectifier configured to convert the electrical signal to a rectified voltage;
a DC-DC converter having an input coupled to receive the rectified voltage and to provide a DC supply voltage at an output thereof;
a low drop-out regulator coupled to receive the DC supply voltage and provide a regulated voltage;
a sensor coupled to receive the regulated voltage, the sensor is configured to sense a condition and provide sensor data indicative of the sensed condition;
a radio frequency module configured to wirelessly transmit the sensor data;
a bias generator having an input coupled to receive the rectified voltage, the bias generator comprising:
 a current bias circuit connected to receive the rectified voltage and configured to generate a bias current that is supplied to the sensor, the DC-DC converter and the low drop-out regulator;
 a startup control circuit connected to the rectified voltage and configured to activate the bias generator;
 an op-amp circuit coupled to the startup control circuit and to receive the rectified voltage, the op-amp circuit configured to regulate a pair of voltages independent of variation in the rectified voltage, the current bias circuit generating the bias current based on the regulated pair of voltages; and a reference voltage generator connected to the rectified voltage, the reference voltage generator being coupled with the current bias circuit and configured to generate a reference voltage that is supplied to the DC-DC converter and the low drop-out regulator, wherein the low drop-out regulator is configured to provide the regulated voltage to the sensor based on the DC supply voltage, the bias current and the reference voltage.

\* \* \* \* \*